(12) United States Patent
Sato et al.

(10) Patent No.: US 6,510,040 B1
(45) Date of Patent: Jan. 21, 2003

(54) MULTILAYER CERAMIC ELECTRONIC COMPONENT

(75) Inventors: Shigeki Sato, Tokyo (JP); Takeshi Nomura, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/869,392

(22) PCT Filed: Oct. 30, 2000

(86) PCT No.: PCT/JP00/07619

§ 371 (c)(1),
(2), (4) Date: Jun. 28, 2001

(87) PCT Pub. No.: WO01/33589

PCT Pub. Date: May 10, 2001

(30) Foreign Application Priority Data

Nov. 1, 1999 (JP) ............................................. 11-311682

(51) Int. Cl.$^7$ .................................................. H01G 4/06
(52) U.S. Cl. ..................................................... 361/321.4
(58) Field of Search ............................... 361/321.4, 15, 361/321.2, 321.3, 321.5

(56) References Cited

U.S. PATENT DOCUMENTS 5,336,532 A * 8/1994 Haluska et al. ............. 427/515

FOREIGN PATENT DOCUMENTS

| JP | A 5-90066 | 4/1993 |
| JP | A 7-201225 | 8/1995 |
| JP | A 8-167536 | 6/1996 |
| JP | A 8-236386 | 9/1996 |
| JP | A 9-260203 | 10/1997 |

* cited by examiner

*Primary Examiner*—Shawn Riley
(74) *Attorney, Agent, or Firm*—Oliff & Berridge, PLC

(57) ABSTRACT

A multiplayer ceramic electronic device comprises an element body constituted by dielectric layers and internal electrode layers alternately stacked. A carbon amount in the element body after firing is not less than 1 ppm and not more than 100 ppm (preferably not less than 2 ppm and not more than 50 ppm, further preferably not less than 3 ppm and not more than 15 ppm). The relationship of the carbon amount in the element body after firing and transverse strength of the electronic device satisfies a formula F=A*ln X+B (ln is natural logarithm) where $23 \leq A \leq 28$, B=350 to 400, F: transverse strength (MPa) and X: carbon amount (ppm) contained in element body.

10 Claims, 7 Drawing Sheets

MULTILAYER CERAMIC ELECTRONIC COMPONENT

TECHNICAL FIELD

The present invention relates to a multilayer ceramic electronic device, such as a multilayer ceramic capacitor, particularly relates to a multilayer ceramic electronic device having an improved permittivity and improved transverse strength.

BACKGROUND ART

A multilayer ceramic capacitor as a multilayer ceramic electronic device comprises an element body configured by alternately stacking dielectric layers and internal electrode layers. The dielectric layer is usually comprised of a dielectric composition wherein barium titanate is a main component and the internal electrode is comprised of Ni or a Ni alloy, etc.

The multi-layer ceramic capacitor is being broadly used as a compact, large capacity, high reliability electronic device. The number used in each piece of electronic equipment has also become larger. In recent years, along with the increasing miniaturization and improved performance of equipment, there have been increasingly stronger demands for further reductions in size, increases in capacity, reductions in price, and improvements in reliability in multilayer ceramic capacitors.

Multilayer ceramic capacitors are normally produced by stacking a paste for forming the internal electrodes and a paste for forming the dielectric layers using the sheet method or printing method etc. and cofiring.

As the electroconductive material for the internal electrodes, generally Pd or a Pd alloy is used, but since Pd is high in price, relatively inexpensive Ni, Ni alloys, and other base metals have come into use. When using a base metal as the electroconductive material of the internal electrode layers, firing in the atmosphere ends up oxidizing the internal electrode layers and therefore the firing of the dielectric layers and internal electrode layers has to be done in a reducing atmosphere by controlling an oxygen partial pressure. Also, an organic binder, etc. used for producing the multilayer ceramic capacitor is hard to be removed by reducing firing, so a resin able to be discomposed at a low temperature are used which is normally degresed under a condition that Ni is not oxidized.

As explained above, since multilayer ceramic capacitors have been made compact and improved in performance, a large number of those have come to be used in a variety of electronic devices. Installation on an electronic circuit substrate is performed by using an automatic installer called a mounter, by which it is installed on an electronic circuit substrate at a high speed. When using such an automatic installer, a large mechanical load is inevitably given on the multilayer ceramic capacitor at the time of conveying the multilayer ceramic capacitor or fixing the capacitor on the electronic circuit substrate. Therefore, when mechanical strength of the multilayer ceramic capacitor is weak, a crack or chip, etc. arises on the capacitor after mounting on the electronic circuit substrate, which leads to a serious hindrance on an operation of the electronic circuit and reliability. From the above background, an improve of mechanical strength of multilayer ceramic capacitors is strongly desired.

Note that the Japanese Unexamined Patent Publication No. 9-260203 schematically describes an improve of strength without declining insulation property of dielectric layers by setting a content of carbon contained in the dielectric layer or internal electrode layer not less than 1 ppm and not more than 5000 ppm. However, the publication only regulates a range of a carbon content contained in the dielectric layers in a general capacitor, and merely describes a wishful surmise without any logical or experimental proofs. For example, it is general that carbon of not more than 5000 ppm is contained in a dielectric layer in a normal capacitor, which does not have any critical meanings.

DISCLOSURE OF INVENTION

An object of the present invention is to provide a multilayer ceramic electronic device, such as a multilayer ceramic capacitor capable of improving a permittivity and other electric characteristics and mechanical strength even when Ni or a Ni alloy is used as an internal electrode.

As a result that the present inventors engaged in intensive studies to attain the above object, it has been found that by setting a content of carbon in an element body after firing of a multilayer ceramic electronic device not less than 1 ppm and not more than 100 ppm, transverse strength of the element body is improved and the permittivity is critically improved, and they have completed the present invention. Also, the inventors have found that it is possible to provide an electronic device easy to be produced having high reliability by maintaining the predetermined relationship between carbon amount contained in an element body after firing of a multilayer ceramic electronic device and transverse strength of the element body, and have completed the present invention.

Namely, a multilayer ceramic electronic device according to a first aspect of the present invention is characterized by comprising an element body constituted by dielectric layers and internal electrode layers alternately stacked, wherein a carbon amount in said element body after firing is not less than 1 ppm and not more than 100 ppm (preferably not less than 2 ppm and not more than 50 ppm, further preferably not less than 3 ppm and not more than 15 ppm).

Also, a multilayer ceramic electronic device according to a second aspect of the present invention is characterized by comprising an element body constituted by dielectric layers and internal electrode layers alternately stacked, wherein
relationship of a carbon amount in the element body after firing and transverse strength of the electronic device satisfies a formula below.

$$F = -A * \ln X + B$$

(ln is a natural logarithm)
note that
$23 \leq A \leq 28$, preferably $24 \leq A \leq 27$
$B = 350$ to $400$, preferably $360$ to $380$
F: transverse strength (MPa)
X: carbon amount (ppm) contained in element body The above internal electrode layer is not particularly limited, but it preferably contains any one of nickel, copper and tungsten, or an alloy of them.

When using nickel and other base metal as the internal electrode layer, firing of the element body is performed under a reducing atmosphere so that the internal electrode layer does not oxidize. Accordingly, when an organic binder used for forming the element body before firing cannot be sufficiently degresed, there is a possibility that carbon remains in a sintered body. It was proved by experiments by the present inventors that strength of the sintered body is deteriorated by the residual carbon.

According to the first aspect of the present invention, preferably, a carbon amount in said element body after firing is not less than 1 ppm and not more than 100 ppm, preferably not less than 2 ppm and not more than 50 ppm. When the carbon amount to be contained is excessive, the permittivity and transverse strength declines, and insulation resistance (IR) and dielectric loss (tan δ) tend to deteriorate. Also, it has been proved by the present inventors that when the carbon amount is too small, the permittivity again declines. According to the first aspect of the present invention, strength of the multilayer ceramic electronic device can be sufficiently improved without deteriorating the electric characteristics.

According to the second aspect of the present invention, by setting a relationship between the carbon amount contained in the element body after firing and transverse strength to be within the above relation range, firing can be performed without causing any cracks or delaminating at the time of firing the element body, the element body after firing becomes sufficiently densificated and sufficient transverse strength required can be obtained.

In the present invention, a dielectric composition constituting the dielectric layer is not particularly limited, but a dielectric composition containing barium titanate as a main component is preferable. In the present invention, particularly preferably the dielectric layer is constituted by a dielectric composition containing a main component expressed by $$[(Ba_{1-x-y}Ca_xSr_y)]m \cdot (Ti_{1-z}Zr_z)O_3.$$

The atom percent ratios, x, y, z and m in the composition of the above main component are preferably in relationships below. Namely, $0<x\leq0.25$, preferably $0<x\leq0.10$ $0<y\leq0.05$, preferably $0<y\leq0.01$ $0<z\leq0.3$, preferably $0.10\leq z\leq0.20$ $0.998\leq m\leq1.020$, preferably $1.002\leq m\leq1.015$.

In this case, MnO as a first subcomponent is preferably contained in an amount of 0.01 to 0.5 wt %, more preferably 0.1 to 0.4 wt % with respect to 100 wt % of the above main component.

Also, $Re_2O_3$ (note that Re is at least one element selected from Dy, Ho, Er and Y) as a second subcomponent is preferably contained in an amount of 0.05 to 0.5 wt %, more preferably 0.2 to 0.4 wt % with respect to the above main component 100 wt %. In the present invention, $Y_2O_3$ is particularly preferable among the $Re_2O_3$.

Furthermore, a sintering aids as a third subcomponent wherein silicon oxide is the main component is preferably contained in an amount of 0.005 to 0.3 wt %, more preferably 0.01 to 0.2 wt % with respect to the above main component 100 wt %. The sintering aids containing silicon oxide as the main component is not particularly limited and is not limited to $SiO_2$ alone, but it may be composite oxides, such as $BaSiO_3$, $CaSiO_3$, $Li_2SiO_3$.

Furthermore, at least one kind from $V_2O_5$, $MoO_3$ and $WO_3$ as a fourth subcomponent is preferably contained in an amount of 0.005 to 0.3 wt %, more preferably 0.01 to 0.1 wt % with respect to the above main component 100 wt %.

$Al_2O_3$ as a fifth subcomponent may be preferably contained in an amount of 0.005 to 0.1 wt %, more preferably 0.01 to 0.1 wt % with respect to the above main component 100 wt %.

The present invention exhibits particularly large effects in the case of a multilayer ceramic electronic device comprising dielectric layers having the above composition (after firing).

BRIEF DESCRIPTION OF DRAWINGS

Below, the present invention will be explained based on an embodiment shown in drawings, wherein.

BEST MODE FOR CARRYING OUT THE INVENTION

Figure 1:
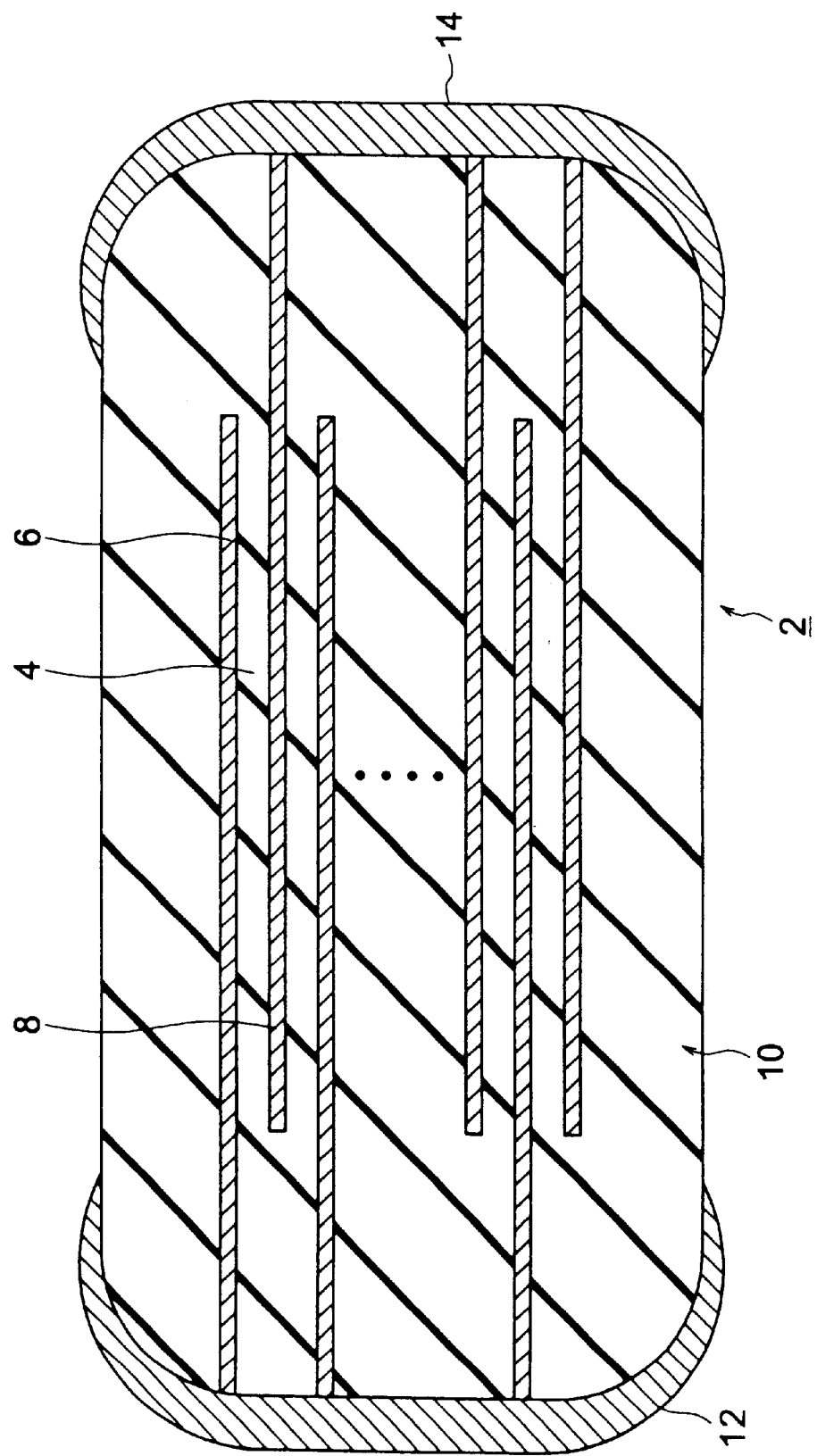
FIG. 1 is a sectional view of a multilayer ceramic capacitor according to the present invention.

Below, the present invention will be explained in detail based on an embodiment shown in the drawings.

Multilayer Ceramic Capacitor

As shown in FIG. 1, the multilayer ceramic capacitor 2 according to one embodiment of the present invention has an element body 10 comprised of dielectric layers 4, first internal electrode layers 6 and second internal electrode layers 8 stacked alternately. At the two ends of the capacitor element body 10 are formed a pair of first external electrodes 12 and second external electrode 14 conductive with the first internal electrode layers 6 or second internal electrode layers 8 alternately arranged inside the element body 10 so as to constitute a capacitor circuit.

In the multilayer ceramic capacitor 2 according to the present invention, the internal electrode layers 6 and 8 are constituted by Ni or a Ni alloy. As the Ni alloy, an alloy of Ni containing at least 95 wt % of Ni and at least one kind of metal element selected from Cr, Co, Al, etc. is preferable.

Conditions of the internal electrode layers 6 and 8, such as a thickness, may be suitably decided in accordance with the object and use, but the thickness is normally 1 to 5 μm, in particular, 1 to 2 μm or so.

The dielectric layer 4 is constituted by grains and a grain boundary phase. It may be ones in a so-called core-shell structure.

A material of the dielectric layer 4 is not specifically limited, but for example a dielectric composition containing a dielectric oxide having a composition (after firing) expressed by the formula below is preferable.

Namely, the dielectric layer 4 is preferably constituted by a dielectric composition containing a main component expressed by $$[(Ba_{1-x-y}Ca_xSr_y)]_m \cdot (Ti_{1-z}Zr_z)O_3 + \alpha MnO + \beta Re_2O_3 + \gamma SiO_2.$$

In the above formula, x, y, z and m indicate atom percentage ratios of respective components, α, β and γ indicate wt % of the respective components when assuming $[(Ba_{1-x-y}Ca_xSr_y)]_m \cdot (Ti_{1-z}Zr_z)O_3$ is 100 wt %, and Re indicates at least one element selected from Dy, Ho, Er and Y.

In this case, x is $0<x\leq0.25$, preferably $0<x\leq0.10$, y is $0<y\leq0.05$, preferably $0<y\leq0.01$, z is $0<z\leq0.3$, preferably $0.10\leq z\leq0.20$, m is $0.998\leq m\leq1.020$, preferably $1.002\leq m\leq1.015$.

Also, α is 0.01 to 0.5 wt %, preferably 0.1 to 0.4 wt %, β is 0.05 to 0.5 wt %, preferably 0.2 to 0.4 wt %, γ is 0.005 to 0.3 wt %, preferably 0.01 to 0.2 wt %.

This dielectric composition contains as other subcomponents at least one kind among $V_2O_5$, $MoO_3$ and $WO_3$ preferably in an amount of 0.005 to 0.3 wt %, further preferably 0.01 to 0.1 wt %.

Also, the dielectric composition may contain as still other subcomponent $Al_2O_3$ preferably in an amount of 0.005 to 0.1 wt %, more preferably 0.01 to 0.1 wt %.

In the case of the dielectric composition as such, effects of the present invention is large. Furthermore, even though firing in a non-oxidizing atmosphere at a relatively low temperature is possible, such a dielectric composition has a high permittivity and the obtained capacitor has an improved accelerating lifetime of insulation resistance.

Conditions of the dielectric layers 4, such as the number of layers and thickness, may be suitably determined in accordance with the object and use. Normally, the number of stacked layers of the dielectric layers 4 is 1 to 600, particularly 10 to 500 or so and the thickness is 1 to 50 μm, particularly 1 to 10 μm or so.

An electroconductive material contained in the electrodes 12 and 14 is not specifically limited, but normally Cu and a Cu alloy or Ni and a Ni alloy, etc. are used. On an outer surface of the external electrodes 12 and 14 is plated with Ni or Sn for better application of solder. A thickness of the external electrodes 12 and 14 may be determined suitably in accordance with the object and use, but normally 10 to 100 μm or so.

The shape and dimensions of the thus obtained multilayer ceramic capacitor 2 may be suitably determined in accordance with the object and use. For example when it is a parallelepiped, the dimensions are normally (0.6 to 3.2 mm)×(0.3 to 1.6 mm)×(0.3 to 1.6 mm) or so.

In the multilayer ceramic capacitor 2 of the present invention, a carbon amount in the element body 10 after firing is not less than 1 ppm and not more than 100 ppm (preferably, not less than 2 ppm and not more than 50 ppm). Also, the relationship between the carbon amount in the element body 10 after fired and transverse strength of the capacitor 2 satisfies the formula below.

$$F = -A * \ln X + B$$

(ln is a natural logarithm)
Note that
  $23 \leq A \leq 28$, preferably $24 \leq A \leq 27$
  B=350 to 400, preferably 360 to 380
  F: transverse strength (MPa)
  X: carbon amount (ppm) contained in element body.

Such a multilayer ceramic capacitor can be produced by the following method. The carbon amount in the element body and the above relationship between the carbon amount and the transverse strength are obtained by specifically selecting a kind of binder in binder removing conditions described below, such as a binder removing temperature, a binder removing time, a binder removing atmosphere, etc. or a firing conditions, such as a firing temperature, a firing time, a firing atmosphere gas, an atmosphere temperature, etc.

Method of Manufacturing Multilayer Ceramic Capacitor

The multilayer ceramic capacitor of the present embodiment is produced by preparing a green chip using the usual printing method or sheet method which uses pastes, firing the green chip, then printing or transferring and sintering the external electrodes.

[Dielectric Layer Paste]

A dielectric layer paste is produced from an organic-based paint comprised of a mixture of a dielectric ingredient and an organic vehicle or a water-based paint.

For the dielectric ingredient, use may be made of the above-mentioned composite-oxides or oxides mixtures, but it is also possible to suitably select and mix various compounds which become the above composite-oxides or oxides by firing for use, for example, carbonates, nitrates, hydroxides, and organic metal compounds. The content of the compounds in the dielectric ingredient may be suitably determined so as to give the above-mentioned composition of the dielectric ceramic composition after firing.

The dielectric ingredient is normally used as a powder of an average particle size of 0.1 to 3.0 μm.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene, and other organic solvents in accordance with the printing method, sheet method, or other method of use.

Further, the water-based paint is made of the water-based binder and dispersant etc. dissolved in water. The water-based binder is not limited and may be suitably selected from a polyvinyl alcohol, cellulose, water-soluble acrylic resin, emulsion, etc.

[Internal electrode Layer Paste]

The internal electrode layer paste is prepared by kneading the electroconductive material together with the above organic vehicle. The electroconductive material is comprised of the above various types of electroconductive metals and alloys or may be various types of oxides, an organic metal compound, resinate, etc., which will changed to the above electroconductive materials after firing.

[External Electrode Paste]

The external electrode paste may be prepared in the same way as the above internal electrode layer paste.

[Organic Vehicle Content]

The content of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total content of these is preferably not more than 10 wt % when an overall amount is assumed to be 100 wt %.

[Green Chip Preparation]

When using a printing method, the dielectric layer paste and the internal electrode layer paste are successively printed on the PET or other substrate. The result is then cut into a predetermined shape, then the pastes are peeled off from the substrate to form a green chip.

While, when using a sheet method, a dielectric layer paste is used to form a green sheet, the internal electrode layer paste is printed on this, then these are stacked to form a green chip.

[Binder Removing Processing]

Binder removing processing for removing the binder before firing may be performed under ordinary conditions, but when using Ni or an Ni alloy or other base metal for the electroconductive material of the internal electrode layer, this is preferably performed under the following conditions:

Rate of temperature rise: 5 to 300° C./hour, in particular 10 to 100° C./hour

Holding temperature: 180 to 400° C., in particular 200 to 300° C.

Temperature holding time: 0.5 to 24 hours, in particular 5 to 20 hours

Atmosphere: in the air atmosphere, an inert gas atmosphere including $H_2O$, or an inert gas atmosphere including $H_2O$ and $H_2$.

Particularly, by performing the binder removing processing in an inert gas atmosphere including $H_2O$, or an inert gas atmosphere including $H_2O$ and $H_2$, it becomes possible to remove the binder while suppressing oxidization of the internal electrode layers. As a result, occurrence of cracks or delaminating is suppressed after sintering the element body. Also, a content of carbon in the element body can be extremely reduced.

[Firing]

The atmosphere when firing the green chip may be suitably determined in accordance with the type of the electroconductive material in the internal electrode layer paste, but when using Ni or an Ni alloy or other base metal as the electroconductive material, the oxygen partial pressure in the firing atmosphere is preferably made $10^{-8}$ to $10^{-14}$ atmospheres. If the oxygen partial pressure is less than this range, the electroconductive material of the internal electrode becomes abnormally sintered and ends up breaking in the middle. Also, if the oxygen partial pressure is more than the above range, the internal electrode layers tend to oxidize.

Further, the holding temperature at the time of firing is preferably 1100 to 1400° C., particularly 1200 to 1360° C. If the holding temperature is less than the above range, the densification becomes insufficient, while if over that range, breaking of the electrodes due to abnormal sintering of the internal electrode layers, deterioration of the capacity-temperature characteristic due to dispersion of the material comprising the internal electrode layers are observed.

Various conditions other than the above conditions may be set as the following.

Rate of temperature rise: 50 to 500° C./hour, in particular 200 to 300° C./hour

Temperature holding time: 0.5 to 8 hours, in particular 1 to 3 hours

Cooling rate: 50 to 500° C./hour, in particular 200 to 300° C./hour

The firing atmosphere is preferably a reducing atmosphere, and as the atmospheric gas, for example, it is preferable to use a wet mixed gas of $N_2$ and $H_2$.

[Annealing]

When firing in a reducing atmosphere, the capacitor chip sintered body is preferably annealed. The annealing process is for reoxidizing the dielectric layer, and thereby, reliability (an IR accelerating lifetime) can be maintained remarkably long.

The oxygen partial pressure in the annealing atmosphere is preferably not less than $10^{-6}$ atmospheres, in particular $10^{-5}$ to $10^{-4}$ atmospheres. If the oxygen partial pressure is less than the above, reoxidation of the dielectric layers is difficult, while if over that range, the internal electrode layers tend to oxide.

The holding temperature at the time of annealing is preferably not more than 1100° C., in particular 500 to 1100° C. If the holding temperature is less than the above range, the oxidation of the dielectric layers becomes insufficient, so the IR tends to become low and the IR lifetime short. On the other hand, when the holding temperature exceeds the above range, not only do the internal electrode layers oxidize and the capacitance fall, but also the internal electrode layers end up reacting with the dielectric material resulting in a tendency toward deterioration of the capacity-temperature characteristic, a fall in the IR, and a fall in the IR lifetime. Note that the annealing may be comprised only of a temperature raising process and temperature reducing process. In this case, the temperature holding time may be made zero and the holding temperature is synonymous with the maximum temperature.

The various conditions other than the above conditions are preferably determined from the following ranges:

Temperature holding time: 0 to 20 hours, in particular 6 to 10 hours

Cooling rate: 50 to 500° C./hour, in particular 100 to 300° C./hour

Note that for the atmospheric gas, wet $N_2$ gas is preferably used.

Note that in the processing for removing the binder, the firing, and the annealing explained above, for example, a wetter etc. may be used to wet the $N_2$ gas or mixed gas. In this case, the temperature of the water is preferably 5 to 75° C.

The processing for removing the binder, firing, and annealing may be performed consecutively or independently.

When performing these consecutively, after processing to remove the binder, the atmosphere is changed without cooling, then the temperature is raised to the holding temperature for firing, the firing is performed, then the chip is cooled, the atmosphere is changed when the holding temperature of the annealing is reached, and then annealing is performed, preferably.

On the other hand, when performing these independently, at the time of firing, preferably the temperature is raised to the holding temperature at the time of the processing for removing the binder in an $N_2$ gas or wet $N_2$ gas atmosphere, then the atmosphere is changed and the temperature is further raised. Preferably, the chip-is cooled to the holding temperature of the annealing, then the atmosphere is changed again to an $N_2$ gas or wet $N_2$ gas atmosphere and the cooling continues. Further, at the time of annealing, the temperature may be raised to the holding temperature in an $N_2$ gas atmosphere, then the atmosphere changed or the entire annealing process may be performed in a wet $N_2$ gas atmosphere.

[External Electrode Forming]

The thus obtained capacitor element body 10 (sintered body) is, for example, end polished using barrel polishing or sandblasting etc., then printed or transferred with an external electrode paste and fired to form the external electrodes 12 and 14. The firing conditions of the external electrode paste are for example preferably 600 to 800° C. for 10 minutes to 1 hour or so in a wet mixed gas of $N_2$ and $H_2$.

Further, in accordance with need, the surfaces of the external electrodes may be formed with a covering layer using plating technique etc.

Note that the present invention is not limited to the above embodiments and may be modified in various ways within the scope of the present invention.

For example, the multilayer ceramic electronic device according to the present invention is not limited to a multilayer ceramic capacitor and includes other devices having an element body comprised of dielectric layers and internal electrode layers alternately stacked.

The present invention will be explained based on further detailed examples below, but the present invention is not limited to the examples.

EXAMPLE 1

In the present example, a multilayer ceramic capacitor comprising a dielectric layer having a composition of $(Ba_{0.97}Ca_{0.03})(Ti_{0.8}Zr_{0.2})+MnO(0.3$ wt %$)+Y_2O_3(0.3$ wt %$)+SiO_2(0.15$ wt %$)+V_2O_5$ (0.04 wt %) was prepared.

First, ingredient powder of $BaTiO_3$, $CaTiO_3$, $BaZrO_3$, $MnCO_3$, $Y_2O_3$ and $SiO_2$ with particle sizes of 0.1 to 1 $\mu m$ were subjected to wet mixing using a ball mill for 16 hours and dried so that dielectric ingredient was prepared.

[Methacrylate (MMA) resin]

4.8 parts by weight of acrylic resin, 40 parts by weight of methylene chloride, 20 parts by weight of ethyl acetate, 6 parts by weight of mineral spirit and 4 parts by weight of acetone with respect to 100 parts by weight of the respective dielectric ingredients were mixed using a ball mill to make a dielectric layer paste.

[Internal Electrode Layer Paste]

100 parts by weight of Ni particles of an average particle size of 0.2 to 0.8 $\mu m$ was kneaded with 40 parts by weight of an organic vehicle (8 parts by weight of an ethyl cellulose resin dissolved in 92 parts by weight of butyl carbitol) and 10 parts by weight of butyl carbitol by using a triple-roll to make an internal electrode paste.

[External Electrode Paste]

100 parts by weight of Cu particles of an average particle size of 0.5 $\mu m$ was kneaded together with 35 parts by weight of an organic vehicle (8 parts by weight of an ethyl cellulose resin dissolved in 92 parts by weight of butyl carbitol), and 7 parts by weight of butyl carbitol to make an external electrode paste.

[Preparation of Element Body]

The above respective dielectric pastes and above internal electrode paste were used to prepare element bodies of a multilayer ceramic capacitor shown in FIG. 1.

The dielectric ceramic paste was used to form a green sheet having a thickness of 15 $\mu m$ on a PET film by using the doctor blade method. An internal electrode paste was printed on this, then the sheet was peeled from the PET film. Next, a plurality of sheets were stacked, adhered by a pressure to prepare a green chip. The number of stacked layer of the sheet having the internal electrode layers was 50.

Next, the green chip was cut to a predetermined size and the binder removing processing, firing and annealing were performed under respective conditions.

[Binder Removing Processing]

Rate of temperature rise: 200° C./hour

Holding temperature: 700° C.

Temperature holding time: 2 hours (flow rate of 2L)

Atmosphere: mixed gas of wet $N_2$ gas and $H_2$ (volume ratio of 3%)

Note that the binder removing processing is performed in a furnace having an inner capacity of 0.01 m³ and the atmosphere gas was flown into the furnace at a flow rate of 2.0 L/minute (liter/minute).

[Firing]

Rate of temperature rise: 200° C./hour

Holding temperature: 1220° C.

Temperature holding time: 2 hours

Cooling rate: 300° C./hour

Atmospheric gas: mixed gas of $N_2$ and $H_2$ (volume ration of 5%) wetted to be dew point temperature (D.P) of 20° C.

Oxygen partial pressure: 1 to $6\times10^{-13}$ atmospheres

[Annealing]

Holding temperature: 1000° C.

Temperature holding time: 2 hours

Cooling rate: 300° C./hour

Annealing atmosphere: wet $N_2$ gas

Oxygen partial pressure: $7\times10^{-7}$ atmospheres

Note that in the processing for removing the binder, the firing, and the annealing, a wetter was used to wet the respective atmospheric gases, the temperature of the water was set to be 20° C. and the dew point of the atmospheric gases were controlled.

[Samples]

The thus obtained capacitor chip fired bodies were end polished on both ends using sandblasting, then the above external electrode paste was transferred, fired at 800° C. for 10 minutes in a wet mixed $N_2+H_2$ to form external electrodes and samples of a multilayer ceramic chip capacitor were obtained.

The dimension of the thus prepared respective samples were 3.2 mm×1.6 mm×0.6 mm, the thickness of the dielectric layer was 10 $\mu m$ and the thickness of the internal electrode was 1.5 to 2.0 $\mu m$.

[Measurement of Carbon Content]

To analyze a quantity of a carbon in the capacitor samples, a carbon/sulfur analysis apparatus (Horiba Ltd. EMIA520) was used. The results are shown in Table 1.

[Electric Characteristics: Permittivity and Tan δ]

Ingredients having the same composition as the prepared samples of the multilayer ceramic chip capacitor were formed to be a disk-shape and electric characteristics testing samples fired under the same conditions were applied In—Ga electrode to be φ5 mm. Next, the capacitance and dielectric loss (tan δ) were measured by an LCR meter under conditions of 1 kHz and 1 Vrms, and the specific permittivity (∈) was calculated from the capacitance, electrode size and thickness of samples. The results are shown in Table 1.

[Transverse Strength]

Three-point bending strength was measured on the multilayer ceramic capacitor (about 3.2 mm×1.6 mm×1.0 mm) prepared for measuring transverse strength. The result is shown in Table 1.

The measurement conditions were a distance between fulcrums L=2 mm and a loading speed=8 mm/sec. and transverse strength F of the multilayer ceramic capacitors was calculated from a load P at the time of being broken and a formula below.

$$F=(3\times P\times L)/(2\times w\times t^2)$$

Note that w is a width and t is a thickness of the multilayer ceramic capacitor.

TABLE 1

| No. | BINDER | BINDER REMOVING CONDITIONS | | | | FIRING CONDITIONS | | | | |
|---|---|---|---|---|---|---|---|---|---|---|
| | | | | ATMOSPHERE | | | | ATMOSPHERIC GAS $N_2$—$H_2$ | | |
| | | TEMPERATURE (°C.) | TIME (hr) | | FLOW RATE (L) | TEMPERATURE (°C.) | TIME (hr) | $H_2$ (%) | FLOW RATE (L) | D.P (°C.) |
| EXAMPLE 1 | MMA | 700 | 2 | $N_2$—$H_2$ (3%)/Wet 20° C.-2L | 2.0 | 1220 | 2 | 5 | 2.0 | 20 |
| EXAMPLE 2 | MMA | 240 | 8 | $N_2$—$H_2$ (3%)/Wet 20° C.-2L | 2.0 | 1220 | 2 | 5 | 2.0 | 20 |
| EXAMPLE 3 | PVB | 240 | 8 | Air | 2.0 | 1220 | 2 | 5 | 2.0 | 20 |
| EXAMPLE 4 | MMA | 240 | 8 | Air | 2.0 | 1220 | 2 | 5 | 2.0 | 20 |
| EXAMPLE 5 | PVB | 240 | 8 | Air | 2.0 | 1220 | 2 | 5 | 2.0 | 20 |
| EXAMPLE 6 | MMA | 240 | 8 | Air | 0.5 | 1220 | 2 | 5 | 0.5 | 20 |
| EXAMPLE 7 | MMA | 240 | 8 | Air | 0.2 | 1220 | 2 | 5 | 0.2 | 20 |
| EXAMPLE 8 | MMA | 240 | 8 | Air | 0.1 | 1220 | 2 | 5 | 0.1 | 20 |
| EXAMPLE 9 | EC | 240 | 8 | Air | 2.0 | 1220 | 2 | 5 | 2.0 | 20 |
| EXAMPLE 10 | EC | 240 | 8 | Air | 0.1 | 1220 | 2 | 5 | 0.1 | 20 |
| EXAMPLE 11 | MMA + C (0.1 wt %) | 240 | 8 | Air | 2.0 | 1220 | 2 | 3 | 2.0 | 20 |
| EXAMPLE 12 | MMA + C (0.1 wt %) | 240 | 8 | Air | 0.1 | 1220 | 2 | 5 | 0.1 | 20 |
| EXAMPLE 13 | MMA + C (1 wt %) | 240 | 8 | Air | 2.0 | 1220 | 2 | 3 | 2.0 | 20 |
| EXAMPLE 14 | MMA + C (1 wt %) | 240 | 8 | Air | 0.1 | 1220 | 2 | 5 | 0.1 | 20 |
| EXAMPLE 15 | MMA + C (2 wt %) | 240 | 8 | Air | 2.0 | 1220 | 2 | 3 | 2.0 | 20 |
| EXAMPLE 16 | MMA + C (2 wt %) | 240 | 8 | Air | 0.1 | 1220 | 2 | 5 | 0.1 | 20 |
| EXAMPLE 17 | MMA + C (3 wt %) | 240 | 8 | Air | 2.0 | 1220 | 2 | 3 | 2.0 | 20 |
| EXAMPLE 18 | MMA + C (3 wt %) | 240 | 8 | Air | 0.1 | 1220 | 2 | 5 | 0.1 | 20 |
| COMPARATIVE EXAMPLE 1 | MMA | 320 | 8 | Air | 0.1 | 1220 | 2 | 5 | 2.0 | 20 |
| COMPARATIVE EXAMPLE 2 | MMA | — | — | — | — | 1220 | 2 | 5 | 2.0 | 20 |

| No. | BINDER | RESIDUAL CARBON AMOUNT (ppm) | $\epsilon R$ | tan δ (%) | IR (Ω · cm) | TRANSVERSE STRENGTH MPa |
|---|---|---|---|---|---|---|
| EXAMPLE 1 | MMA | 1 | 7944 | 0.61 | 8.30E + 12 | 372.6 |
| EXAMPLE 2 | MMA | 2 | 8817 | 0.54 | 8.40E + 12 | 341.2 |
| EXAMPLE 3 | PVB | 4 | 10103 | 0.53 | 7.40E + 12 | 335.4 |
| EXAMPLE 4 | MMA | 6 | 11269 | 0.55 | 7.50E + 12 | 329.5 |
| EXAMPLE 5 | PVB | 8 | 11277 | 0.58 | 1.60E + 12 | 314.8 |
| EXAMPLE 6 | MMA | 10 | 10831 | 0.57 | 7.00E + 11 | 313.8 |
| EXAMPLE 7 | MMA | 16 | 9942 | 0.59 | 8.10E + 11 | 300.6 |
| EXAMPLE 8 | MMA | 17 | 9604 | 0.58 | 6.80E + 11 | 297.1 |
| EXAMPLE 9 | EC | 25 | 8946 | 0.61 | 6.60E + 11 | 292.2 |
| EXAMPLE 10 | EC | 31 | 8473 | 0.64 | 3.80E + 11 | 275.5 |
| EXAMPLE 11 | MMA + C (0.1 wt %) | 38 | 8281 | 0.68 | 3.40E + 11 | 273.6 |
| EXAMPLE 12 | MMA + C (0.1 wt %) | 70 | 7501 | 1.05 | 3.00E + 11 | 248.1 |
| EXAMPLE 13 | MMA + C (1 wt %) | 104 | 7339 | 1.3 | 2.40E + 11 | 247.1 |
| EXAMPLE 14 | MMA + C (1 wt %) | 133 | 7079 | 1.5 | 2.00E + 11 | 244.2 |
| EXAMPLE 15 | MMA + C (2 wt %) | 157 | 6503 | 1.9 | 1.20E + 11 | 236.3 |
| EXAMPLE 16 | MMA + C (2 wt %) | 182 | 6066 | 2.3 | 1.10E + 11 | 234.4 |
| EXAMPLE 17 | MMA + C (3 wt %) | 201 | 6011 | 2.5 | 1.06E + 11 | 220.6 |
| EXAMPLE 18 | MMA + C (3 wt %) | 346 | 6003 | 5.9 | 3.30E + 10 | 216.7 |
| COMPARATIVE EXAMPLE 1 | MMA | 10 | DELAMINATING | | | 246.1 |
| COMPARATIVE EXAMPLE 2 | MMA | 40 | 6320 | 8.6 | 4.30E + 10 | 327.5 |

EXAMPLE 2

Samples of a capacitor and electric characteristic testing samples were prepared in the same way as in the above example 1, except that the temperature rising rate was set to be 15° C./hour, the holding temperature 240° C. and temperature holding time 8 hours (flow rate of 2 L) at the time of removing the binder, and the same test as in the example 1 was conducted. The results are shown in table 1.

EXAMPLE 3

Samples of a capacitor and electric characteristic testing samples were prepared in the same way as in the above example 1 except that a butyral (PVB) resin was used as a binder in the dielectric layer paste, the temperature rising rate was set to be 15° C./hour, the holding temperature 240° C., temperature holding time 8 hours (flow rate of 2 L) and an atmosphere was in the air at the time of removing the binder, and the same test as in the example 1 was conducted. The results are shown in table 1.

Note that as a dielectric layer paste, 100 parts by weight of the dielectric ingredients mixed with 4 parts by weight of butyral resin, 1 part by weight of phthalic acid diethyl, 10 parts by weight of denatured alcohol and 6 parts by weight of n-propanol by a ball mill to make a paste was used.

EXAMPLE 4

Samples of a capacitor and electric characteristic testing samples were prepared in the same way as in the above example 3 except that a MMA resin was used as a binder in the dielectric layer paste, and the same test as in the example 1 was conducted. The results are shown in table 1.

EXAMPLE 5

Samples of a capacitor and electric characteristic testing samples were prepared in the same way as in the above example 3, and the same test as in the example 1 was conducted. The results are shown in table 1.

EXAMPLE 6

Samples of a capacitor and electric characteristic testing samples were prepared in the same way as in the above example 3 except that a MMA resin was used as a binder in the dielectric layer paste and a flow rate of an atmospheric gas at the time of removing a binder and firing was made to be 0.5 L/min., and the same test as in the example 1 was conducted. The results are shown in table 1.

EXAMPLE 7

Samples of a capacitor and electric characteristic testing samples were prepared in the same way as in the above example 3 except that a MMA resin was used as a binder in the dielectric layer paste and a flow rate of an atmospheric gas at the time of removing a binder and firing was made to be 0.2 L/min., and the same test as in the example 1 was conducted. The results are shown in table 1.

EXAMPLE 8

Samples of a capacitor and electric characteristic testing samples were prepared in the same way as in the above example 3 except that a MMA resin was used as a binder in the dielectric layer paste and a flow rate of an atmospheric gas at the time of removing a binder and firing was made to be 0.1 L/min., and the same test as in the example 1 was conducted. The results are shown in table 1.

EXAMPLE 9

Samples of a capacitor and electric characteristic testing samples were prepared in the same way as in the above example 3 except that an ethyl cellulose (EC) resin was used as a binder in the dielectric layer paste, and the same test as in the example 1 was conducted. The results are shown in table 1.

Note that as a dielectric layer paste, 100 parts by weight of the dielectric ingredients was kneaded with 40 parts by weight of an organic vehicle (8 parts by weight of an ethyl cellulose resin dissolved in 92 parts by weight of butyl carbitol) and 10 parts by weight of butyl carbitol by using a triple-roll to make a paste was used.

Also, in the present example, the adjusted dielectric layer paste was printed on a PET film by a printing method, dried, then, an internal electrode paste was printed thereon. By repeating this process for a several times, a multilayer body before removing a binder was formed.

EXAMPLE 10

Samples of a capacitor and electric characteristic testing samples were prepared in the same way as in the above example 9 except that a flow rate of an atmospheric gas at the time of removing a binder and firing was made to be 0.1 L/min., and the same test as in the example 1 was conducted. The results are shown in table 1.

EXAMPLE 11

Samples of a capacitor and electric characteristic testing samples were prepared in the same way as in the above example 2 except that carbon particles with an average grain diameter of 0.8 µm in a ratio of 0.1 part by weight was contained in 100 parts by weight of dielectric ingredient in the dielectric layer paste, an atmospheric gas at binder removing was made to be the air and the volume ratio of $H_2$ in a firing atmosphere was made to be 3%, and the same test as in the example 1 was conducted. The results are shown in table 1.

EXAMPLE 12

Samples of a capacitor and electric characteristic testing samples were prepared in the same way as in the above example 11 except that a flow rate of an atmospheric gas at the time of removing a binder and firing was made to be 0.1 L/min. and the volume ratio of $H_2$ in a firing atmosphere was made to be 5%, and the same test as in the example 1 was conducted. The results are shown in table 1.

EXAMPLE 13

Samples of a capacitor and electric characteristic testing samples were prepared in the same way as in the above example 2 except that carbon particles with an average grain diameter of 0.8 µm in a ratio of 1 part by weight was contained in 100 parts by weight of dielectric ingredient in the dielectric layer paste, an atmospheric gas at binder removing was made to be the air and the volume ratio of $H_2$ in a firing atmosphere was made to be 3%, and the same test as in the example 1 was conducted. The results are shown in table 1.

EXAMPLE 14

Samples of a capacitor and electric characteristic testing samples were prepared in the same way as in the above example 13 except that a flow rate of an atmospheric gas at the time of removing a binder and firing was made to be 0.1 L/min. and the volume ratio of $H_2$ in a firing atmosphere was made to be 5%, and the same test as in the example 1 was conducted. The results are shown in table 1.

EXAMPLE 15

Samples of a capacitor and electric characteristic testing samples were prepared in the same way as in the above example 2 except that carbon particles with an average grain diameter of 0.8 µm in a ratio of 2 parts by weight was contained in 100 parts by weight of dielectric ingredient in the dielectric layer paste, an atmospheric gas at binder removing was made to be the air and the volume ratio of $H_2$ in a firing atmosphere was made to be 3%, and the same test as in the example 1 was conducted. The results are shown in table 1.

EXAMPLE 16

Samples of a capacitor and electric characteristic testing samples were prepared in the same way as in the above example 15 except that a flow rate of an atmospheric gas at the time of removing a binder and firing was made to be 0.1 L/min. and the volume ratio of $H_2$ in a firing atmosphere was made to be 5%, and the same test as in the example 1 was conducted. The results are shown in table 1.

EXAMPLE 17

Samples of a capacitor and electric characteristic testing samples were prepared in the same way as in the above example 2 except that carbon particles with an average grain diameter of 0.8 μm in a ratio of 3 parts by weight was contained in 100 parts by weight of dielectric ingredient in the dielectric layer paste, an atmospheric gas at binder removing was made to be the air and the volume ratio of $H_2$ in a firing atmosphere was made to be 3%, and the same test as in the example 1 was conducted. The results are shown in table 1.

EXAMPLE 18

Samples of a capacitor and electric characteristic testing samples were prepared in the same way as in the above example 17 except that a flow rate of an atmospheric gas at the time of removing a binder and firing was made to be 0.1 L/min. and the volume ratio of $H_2$ in a firing atmosphere was made to be 5%, and the same test as in the example 1 was conducted. The results are shown in table 1.

Comparative Example 1

Samples of a capacitor and electric characteristic testing samples were prepared in the same way as in the above example 1 except that the temperature rising rate was set to be 15° C./hour, the holding temperature 320° C., temperature holding time 8 hours (flow rate of 0.1 L) and an atmosphere at the time of removing the binder was in the air, and the same test as in the example 1 was conducted. The results are shown in table 1.

Comparative Example 2

Samples of a capacitor and electric characteristic testing samples were prepared in the same way as in the above example 1 except that the firing was performed under a strong reducing atmosphere condition below, and the same test as in the example 1 was conducted. The results are shown in table 1.

[Firing Condition]

Rate of temperature rise: 200° C./hour

Holding temperature: 1220° C.

Temperature holding time: 2 hours

Cooling rate: 300° C./hour

Firing atmosphere: mixed gas of $N_2$ and $H_2$ wetted to be dew point temperature of 0° C.

Oxygen partial pressure: $5 \times 10^{-14}$ atmospheres

In the present comparative example, a carbon content in the capacitor sample could be increased and the transverse strength was improved, however, the insulation resistance was declined, the dielectric loss was deteriorated and the electric characteristics was declined.

EVALUATION

Figure 2:
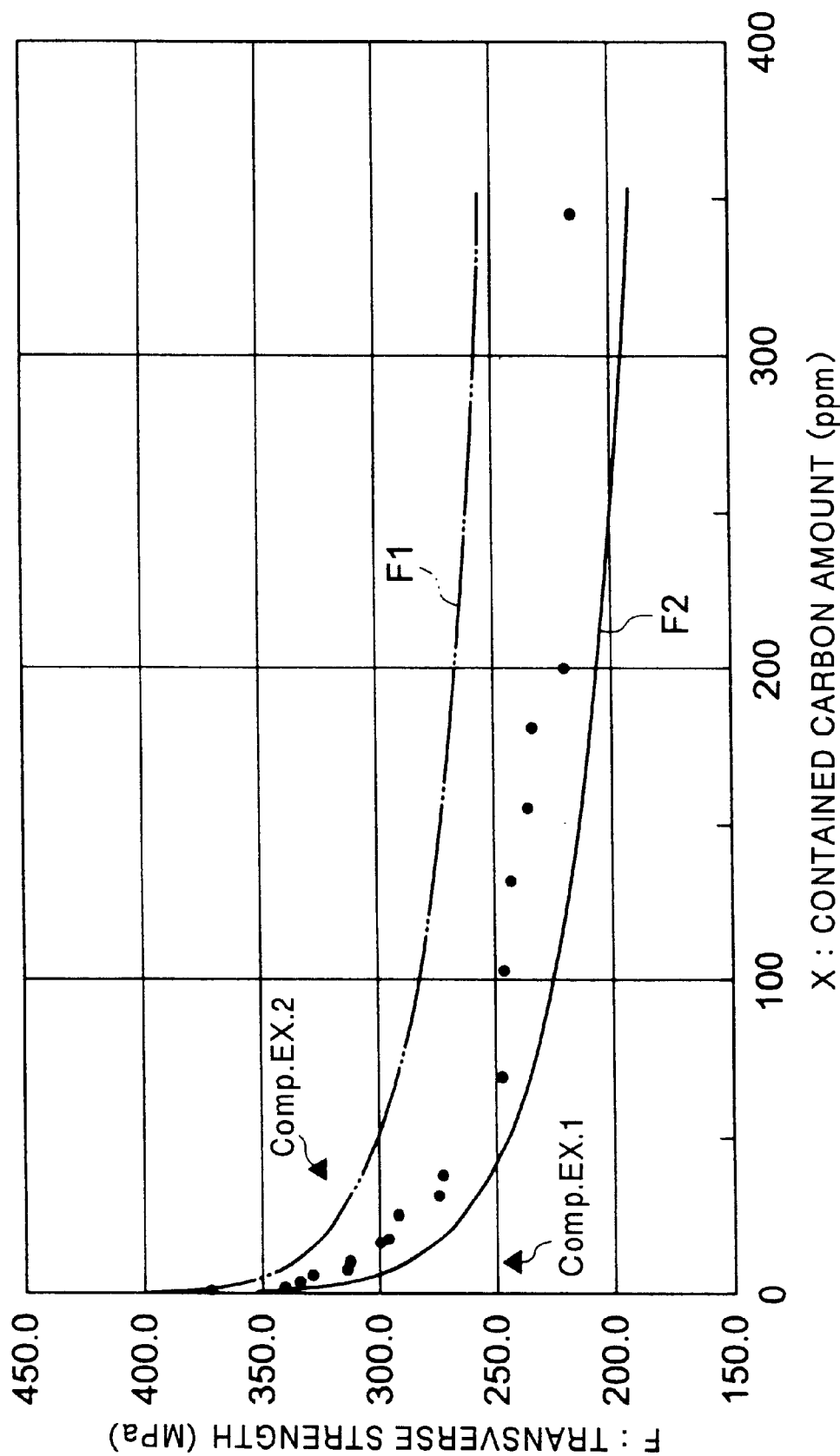
FIG. 2 is a graph of a relationship of a contained carbon amount and transverse strength in an example of the present invention.
Figure 3:
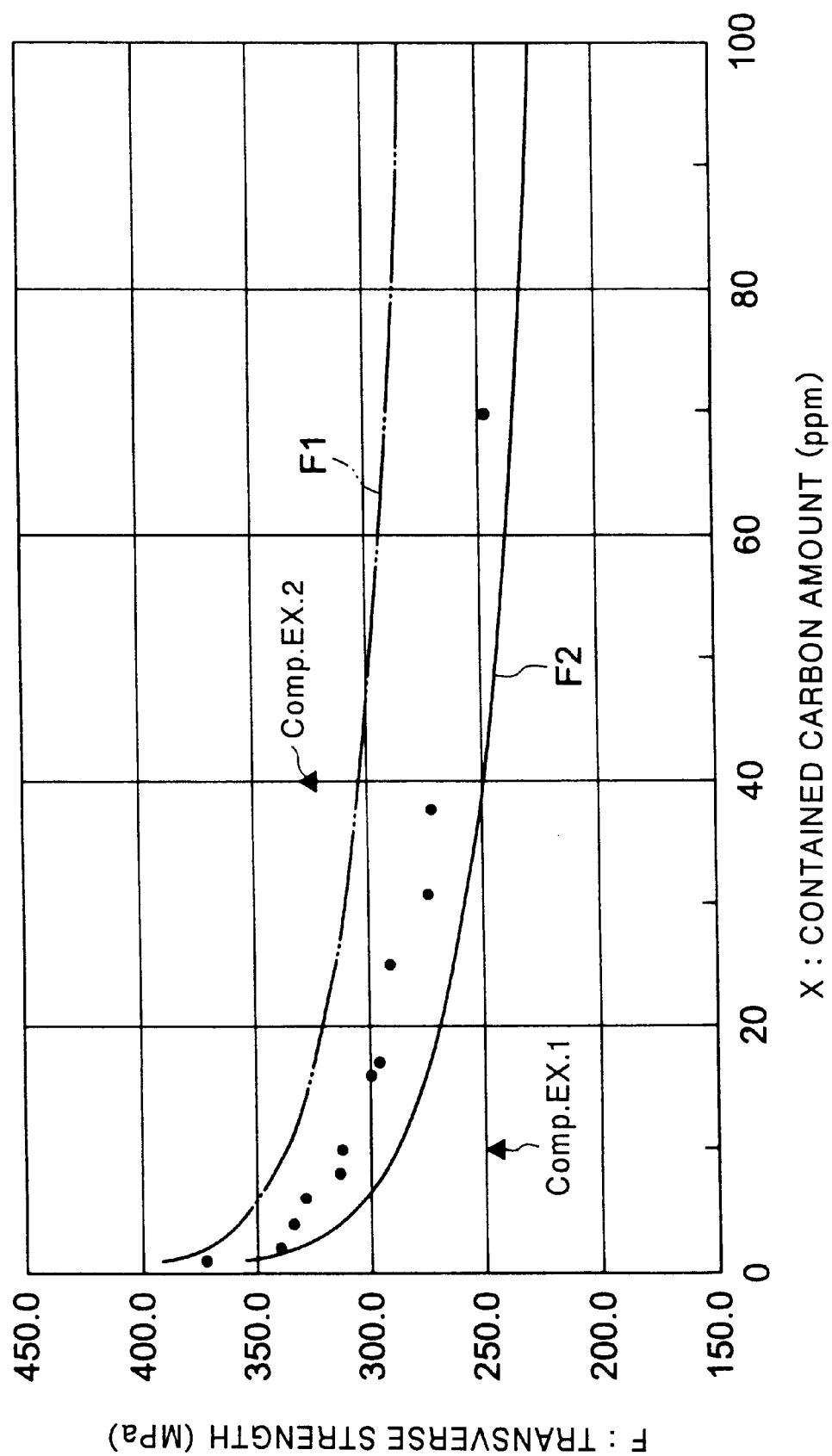
FIG. 3 is an enlarged graph of FIG. 2.

The relationship of the contained carbon amount and transverse strength in the capacity samples of the examples 1 to 18 was plotted with diamond-shaped black dots in FIG. 2 and FIG. 3. Further, the relationship of the contained carbon amount and transverse strength in the capacity samples of the comparative examples 1 and 2 was plotted with triangle-shaped black dots in FIG. 2 and FIG. 3. It was confirmed that the all dots came within a range surrounded by curves F1 and F2 and that the formula below was satisfied in the examples 1 to 18.

$$F=-A*\ln X+B$$

(ln is a natural logarithm)

Note that $23 \leq A \leq 28$, B=350 to 400,

F: transverse strength (MPa)

X: carbon amount (ppm) contained in element body.

While, it was confirmed that the comparative examples 1 and 2 went outside the range surrounded by the curves F1 and F2 and do not satisfy the above formula.

Figure 4:
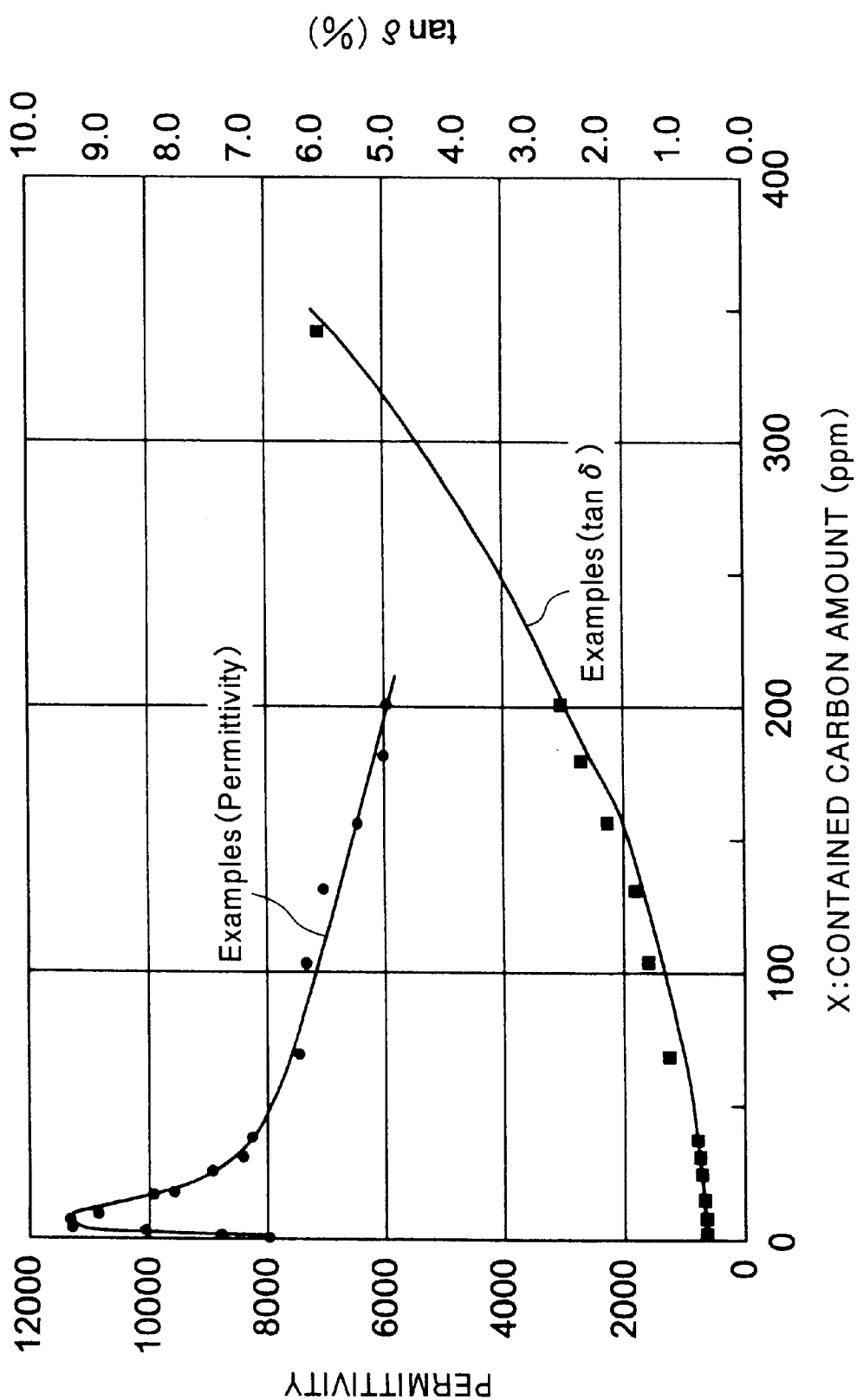
FIG. 4 is a graph of a relationship of a contained carbon amount, permittivity and dielectric loss in an example of the present invention.
Figure 5:
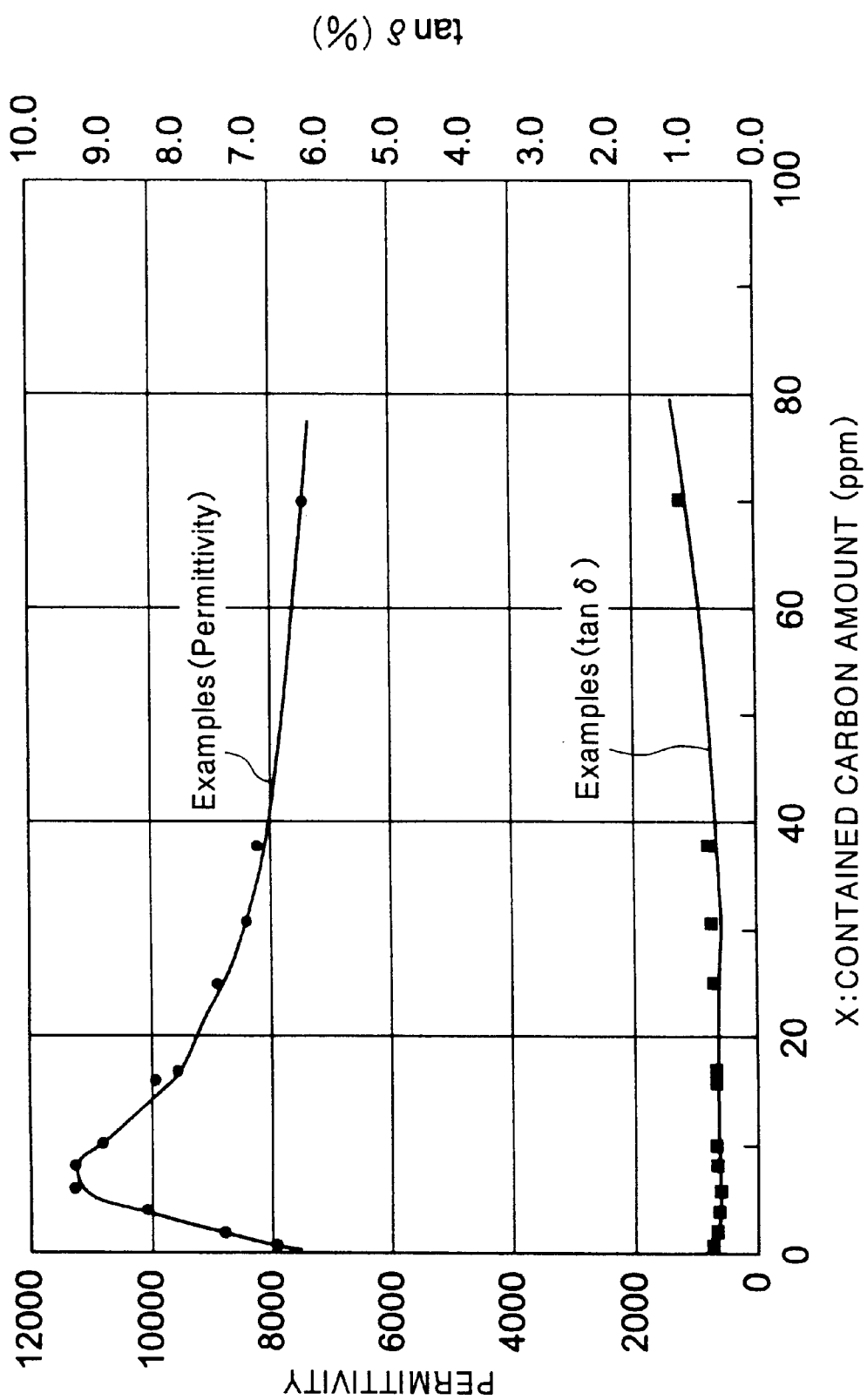
FIG. 5 is an enlarged graph of FIG. 4.

The relationship of the contained carbon amount and permittivity in the capacity samples of the examples 1 to 18 was plotted with diamond-shaped black dots in FIG. 4 and FIG. 5, and the relationship of the contained carbon amount and dielectric loss was plotted with square block dots. As shown in FIG. 4 and FIG. 5, it was confirmed that the permittivity particularly improved when the carbon content in samples is not less than 1 ppm and not more than 100 ppm, preferably not less than 2 ppm and not more than 50 ppm, more preferably not less than 3 ppm and not more than 15 ppm.

Figure 6:
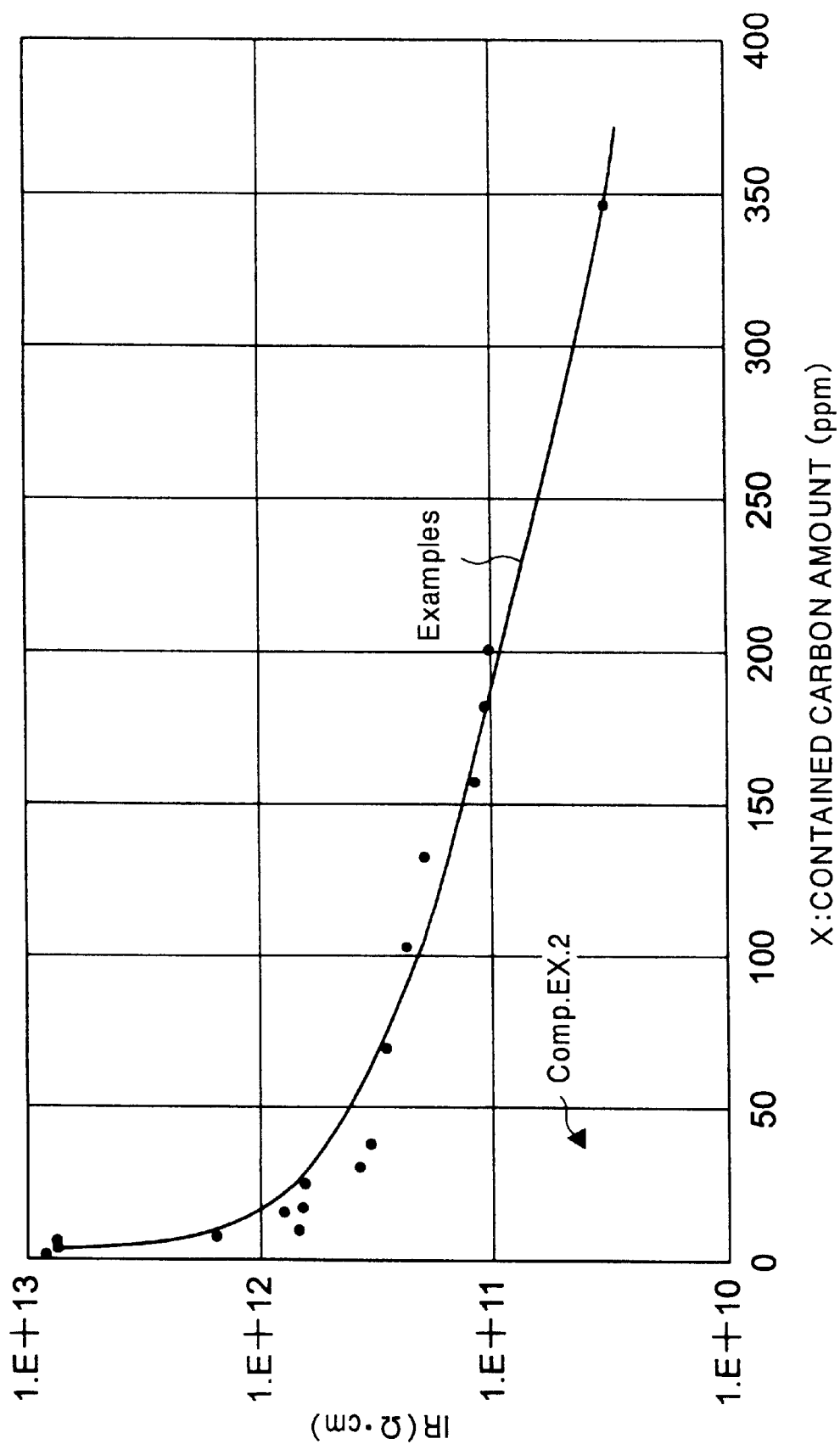
FIG. 6 is a graph of a relationship of a contained carbon amount and insulation resistance in an example of the present invention.
Figure 7:
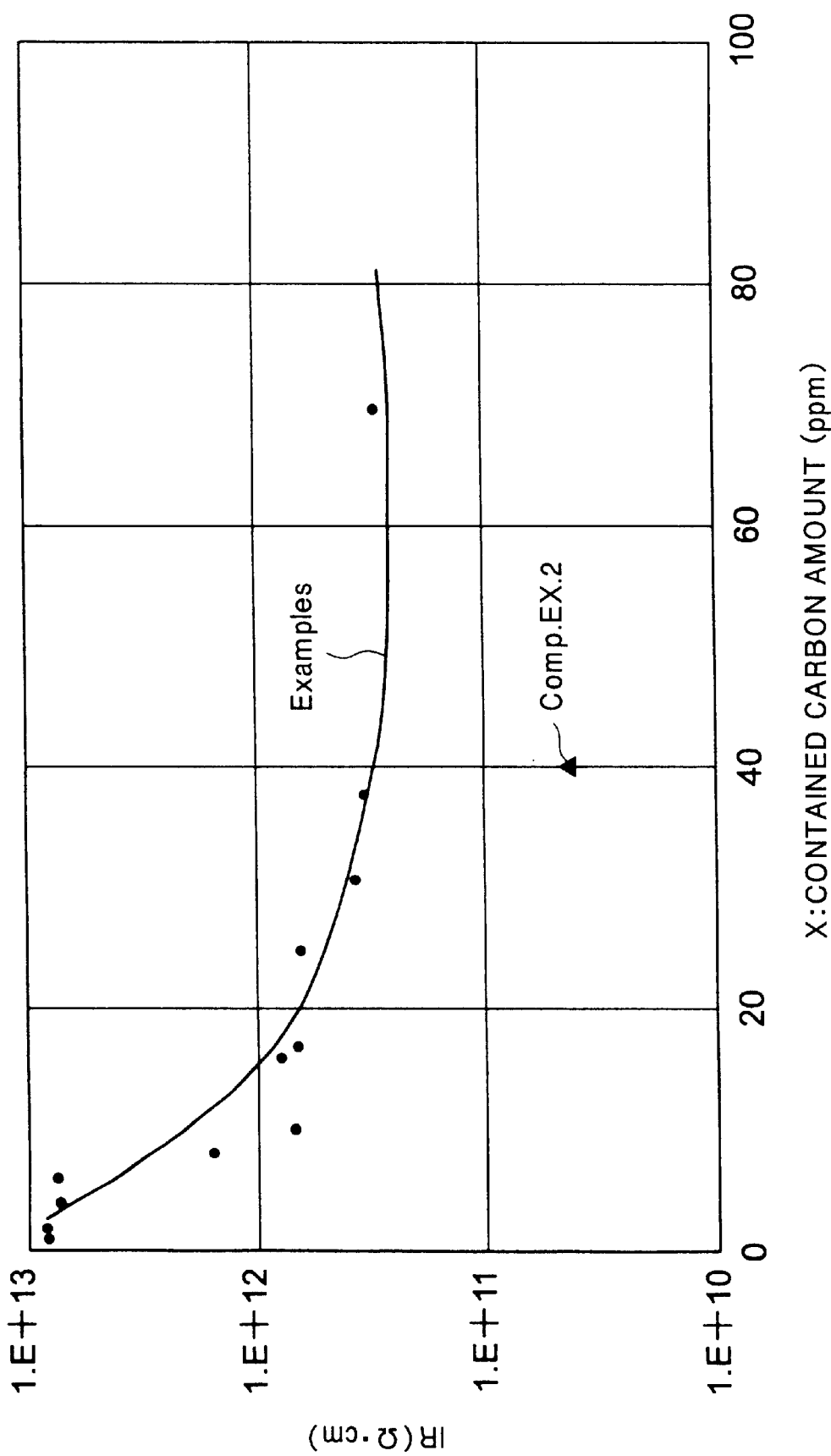
FIG. 7 is an enlarged graph of FIG. 6.

The relationship of the contained carbon amount and IR in the capacity samples of the examples 1 to 18 was plotted with diamond-shaped black dots in FIG. 6 and FIG. 7. While the relationship of the contained carbon amount and IR in the capacity samples of the comparative examples 2 was plotted with triangle black dots in FIG. 6 and FIG. 7. It was observed that the IR was reduced as the contained carbon amount increased in the examples 1 to 18, and a reduction of the IR was observed in the comparative example 2 when comparing with examples having the same carbon amount.

As explained above, according to a first aspect of the present invention, strength of multilayer ceramic electronic devices can be sufficiently maintained in a range of not deteriorating the electric characteristics.

According to a second aspect of the present invention, by setting the relationship of a content of carbon and transverse strength in a element body after firing within the range of the above relationship, firing can be performed without causing any cracks or delaminating at the time of firing the element body, the element body after firing can be sufficiently densificated, and a sufficient transverse strength required can be obtained.

What is claimed is:

1. A multilayer ceramic electronic device comprising an element body constituted by dielectric layers and internal electrode layers alternately stacked, characterized in that a carbon amount in said element body after firing is not less than 1 ppm and not more than 100 ppm, and a relationship of a carbon amount in said element body after firing and transverse strength of the electronic device satisfies the formula:

$$F=-A*\ln X+B$$

(ln is natural logarithm), where $23 \leq A \leq 28$, B=350 to 400,

F: transverse strength (MPa)

X: carbon amount (ppm) contained in element body.

2. A multilayer ceramic electronic device comprising an element body constituted by dielectric layers and internal electrode layers alternately stacked, characterized in that a carbon amount in said element body after firing is not less than 1 ppm and not more than 100 ppm, and said internal electrode layer includes any one of nickel, copper and tungsten or an alloy of these.

3. A multilayer ceramic electronic device comprising an element body constituted by dielectric layers and internal electrode layers alternately stacked, characterized in that relationship of a carbon amount in said element body after firing and transverse strength of the electronic device satisfies a formula below:

$$F = -A * \ln X + B$$

(ln is natural logarithm)
Note that $23 \leq A \leq 28$, B=350 to 400,

F: transverse strength (MPa)

X: carbon amount (ppm) contained in element body.

4. The multilayer ceramic electronic device as set froth in claim 3, characterized in that said internal electrode layer includes any one of nickel, copper and tungsten or an alloy of these.

5. A multilayer ceramic electronic device comprising an element body constituted by dielectric layers and internal electrode layers alternately stacked, characterized in that a carbon amount in said element body after firing is not less than 1 ppm and not more than 100 ppm, and at least one of said dielectric layers is constituted by a dielectric composition having a main component expressed by $$[(Ba_{1-x-y}Ca_xSr_y)]_m \cdot (Ti_{1-z}Zr_z)O_3.$$

6. The multilayer ceramic electronic device as set froth in claim 5, characterized in that atom percentage ratios x, y, z and m in a composition formula of said main component are in the relationship below:

$0 > x \leq 0.25$, $0 > y \leq 0.05$, $0 > z \leq 0.3$, and $0.998 \leq m \leq 1.020$.

7. The multilayer ceramic electronic device as set forth in claim 5, characterized in that MnO is contained as a first subcomponent in an amount of 0.01 to 0.5 wt %.

8. The multilayer ceramic electronic device as set forth in claim 5, characterized in that $Re_2O_3$ (note that Re is at least one element selected from Dy, Ho, Er and Y) is contained as a second subcomponent in an amount of 0.05 to 0.5 wt % with respect to 100 wt % of said main component.

9. The multilayer ceramic electronic device as set forth in claim 5, characterized in that a sintering aids wherein silicon oxide is a main component is contained as a third subcomponent in an amount of 0.005 to 0.3 wt % with respect to 100 wt % of said main component.

10. The multilayer ceramic electronic device as set forth in claim 5, characterized in that at least one kind among $V_2O_5$, $MoO_3$ and $WO_3$ is contained as a fourth subcomponent in an amount of 0.005 to 0.3 wt % with respect to 100 wt % of said main component.

* * * * *